Aug. 10, 1965    R. G. LINS ETAL    3,199,371
VISCOUS COUPLER DEVICE FOR MODEL VEHICLES
Filed May 31, 1962
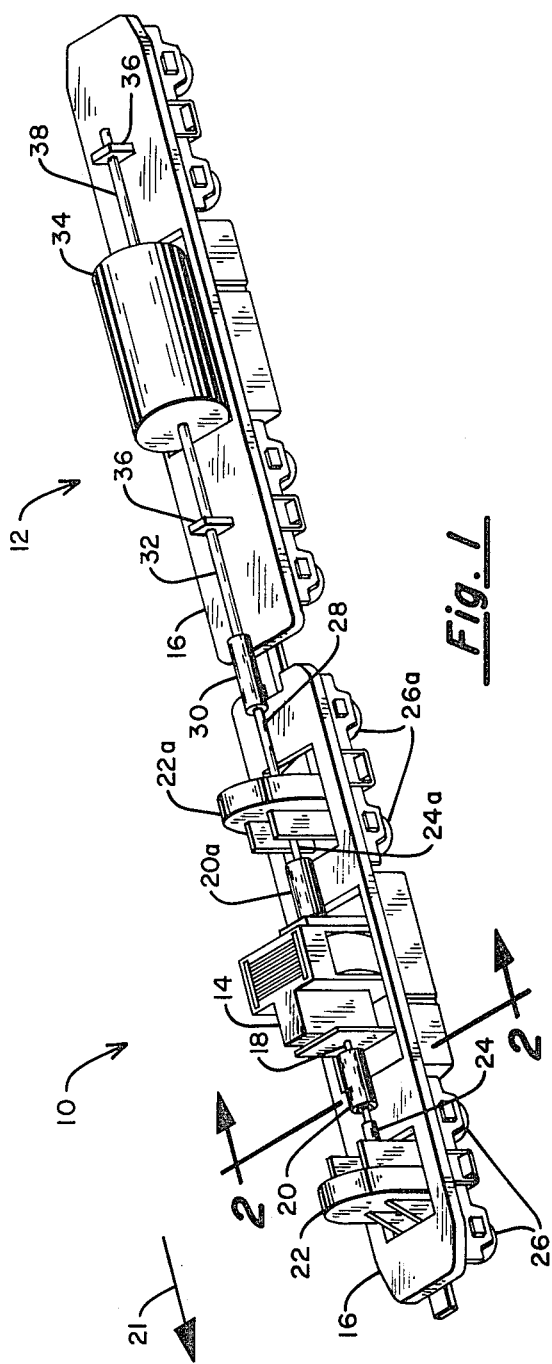
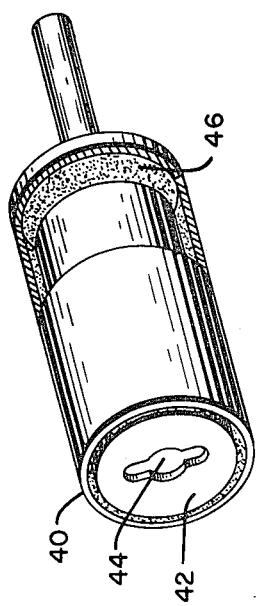
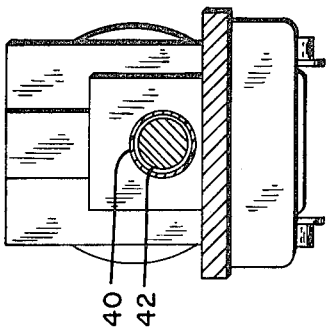
INVENTORS
RAYMOND G. LINS
STANLEY J. LINS
BY Marvin Jacobson
ATTORNEY

United States Patent Office 3,199,371
Patented Aug. 10, 1965

3,199,371
VISCOUS COUPLER DEVICE FOR MODEL
VEHICLES
Raymond G. Lins, 2035 Opal Place, St. Paul, Minn., and
Stanley J. Lins, 3736 Cedar Ave., Minneapolis, Minn.
Filed May 31, 1962, Ser. No. 199,010
5 Claims. (Cl. 74—664)

This invention relates generally to wheel-propelled self-driven toy vehicles and in particular to the mechanism for applying the motive power to the driving wheels in vehicles of this type.

Although the instant invention finds its greatest use in the field of model trains, it should be understood that it is not so limited and that it is within contemplation that the invention is adaptable to other types of wheel-propelled, self-driven model vehicles. The following stated features and objects as well as the detailed description are all in relation to model trains. However, it will be obvious that these same features and objectives are realizable by adapting this invention, under the teachings contained herein, to other types of toy vehicles.

Model train fanciers, and especially the more avid collectors, are generally concerned with making the models appear to operate essentially the same as the full-scale train. Unlike the full-scale train, and especially the diesel engine, most present day models start with a rush when the motive power is first applied to the wheels and stop suddenly with locked wheels when power is removed. Preferably, the starting and stopping should be with a smooth rolling motion of the wheels. It is the primary object of this invention to provide means for effecting a smooth start and stop of a model, wheel-propelled vehicle which has a self-contained source of motive power.

There has been developed in the past apparatus for obtaining the above object by incorporating elastic members in the transmission mechanism between the main power source and the wheels. These have some disadvantages such as uncontrollable slippage and deterioration. Therefore it is a further object of this invention to obtain the first mentioned object wherein the means has a relatively high-degree of reliability.

In general, the engine unit of the model train includes a rotating main power member and a transmission coupled to the latter for applying motive power to the wheels. The instant invention incorporates a viscous coupler intermediate the main power member and the transmission. The coupler comprises a driving member engaged with the main power member, a driven member coupled to the transmission and a spaced-apart relationship with the driving member and viscous fluid in the space between the two latter members. The arrangement of the members and the characteristics of the fluid are such that the torque developed by the rotating driving member, when rotation of the main power member is initiated, is gradually applied to the wheel transmission via the fluid and the driven member. In this manner the power to the wheels is applied gradually so that a rolling start is effected. Furthermore, in stopping by cessation of rotation of the main power member, the driven member is still able to rotate while damped by the fluid so that the wheels are not locked but are able to come to a rolling stop. As a further feature of this invention the fluid serves a dual function as a lubricant and a cooling agent.

As a still further feature of this invention, the driving and driven members of the viscous coupler are respectively detachably engaged with the main power member and the transmission to facilitate installation and removal.

An adaptation of this invention includes a flywheel coupled to the main power member to provide additional inertia thereto to further aid in smoothing the starting and stopping.

Yet another feature of this invention is to achieve all the objects and features with a relatively simple and inexpensive apparatus which is easily incorporated as a modification to present day model trains.

These and other objects and features will become apparent in the course of the following detailed description, reference being made to the drawings in which:

FIG. 1 is a general perspective view of a two-car model train incorporating an embodiment of the instant invention;

FIG. 2 is a cut-away section view showing in detail the relative displacement between the driving and driven members of an embodiment of this invention;

FIG. 3 is an enlarged partially sectioned perspective view showing still further detail of a preferred embodiment of this invention.

In FIG. 1 there is shown a model locomotive or engine, designated generally as 10, and another car, generally designated 12, coupled to the engine. Those parts in both units which are generally common are designated with identical item numbers. A main power source, 14, is fixedly mounted by any well-known means to the upper side of a substantially flat main frame, 16. The main power source is preferably an electric motor having a rotating main drive shaft, 18, which extends longitudinally in a general direction parallel to the line of travel of the model train. Arrow 21 shows generally the direction of travel. The main drive shaft extends both forwardly and rearwardly from the power source 14. Connected coaxially to the forwardly extending section of the main drive shaft is the driving member of a cylindrically shaped viscous coupler designated generally as 20 which is shown in greater detail in FIGS. 2 and 3. Coaxial with the driving member is a driven member which is coupled to transmission 22 via a further rotatable shaft, 24. The latter is connected coaxial to the driven member. The transmission 22 is any well-known type of mechanism for applying the received motive power to the wheels to effect the forward (as well as reverse) motion. Typically the transmission comprises a gear combination which includes a worm gear which may be an integral part of the connecting axle between the transversely spaced-apart propelling wheels. The detailed design of the transmission is a matter of choice and is not pertinent to the instant invention. Suffice is to point out that the transmission, for the unit shown illustratively in FIG. 1, receives the rotational torque from shaft 24 which is above the main frame 16 and which rotates about an axis generally parallel to the line of direction of travel and applies this as a rotational torque to the wheels underneath the main frame about an axis of rotation substantially transverse to the line of travel. One wheel, 26, of two pair of wheels is shown in part in FIG. 1. Although both sets of wheels may be driven by the transmission, obviously the essential factor is that at least one of the sets of wheels be so driven.

Referring now to the rearward section of the engine 10, the rearward extension of the main power shaft 18 (not visible in FIG. 1) is connected to another viscous coupler, designated 20a, in the same manner as the forward extension. Similarly, the driven member of the viscous coupler 20a is coupled to transmission 22a via a rotatable shaft member, 24a. The rearwardly mounted transmission 22a drives rear wheels in the same manner as the forwardly mounted transmission 22 drives the forward wheels. Again, only a part of one wheel, 26a, of two pairs of rear wheels is shown in FIG. 1. The rearward extending shaft 24a is coupled to transmission 22a to apply rotational power thereto and extends still further, as shown at 28, in a rearward direction beyond the transmission toward the second car, 12, of the two unit train. Although preferably shaft 28 is an integral part of shaft 24a it is designated with a different item number for purposes of description. An apertured flexible coupler, 30, which is preferably a short length of rubber tubing, is tightly attached at one end to shaft 28 and at the other end to another shaft 32 which in turn is fixedly attached to a flywheel 34 contained in the second car 12 of the two unit model train. The flywheel is supported by a pair of mounting members, 36, on the second car which have bearing inserts for allowing relatively frictionless rotation of the flywheel shafts, 32 and 38. Since the flywheel is mounted on a car separate from the locomotive or engine, the flexible coupler 30 serves to keep the shafts 28 and 32 coupled together even when their axial alignment is slightly displaced. Preferably, the flywheel is a solid metal, cylindrically shaped body. Due to its inertia, the flywheel develops a negative torque, $-L$, which is applied to the main power shaft to further minimize any sudden acceleration or deceleration of the train. The amount of torque developed is a function of the moment of inertia, $I$, and the angular acceleration, $dw/dt$, of the flywheel and is determined by the equation, $$L = I\, dw/dt$$

The wheels of both units (and any additional units) are, of course, mounted on tracks, not shown. In the well-known manner, when the main power source 14 is an electric motor the electrical energy is transmitted from its source to the main motive-power source 14 by an electrical conduction path which includes the tracks and the wheels. If the source 14 is not electrically driven, as for example if it is a gasoline powered engine, the wheels as well as the tracks need not be electrical conductors.

FIG. 2 shows a cross-sectioned end view of the viscous coupler 20 in accordance with section line 2—2 of FIG. 1. FIG. 3 shows an enlarged perspective view of the viscous coupler 20 with a sectioned out portion to more clearly describe the relationship of the driven and driving members. The outer, hollowed-out cylindrical member 40 will be referred to as the driving member. It will become obvious from the following description that the two members are functionally interchangeable. The outer diameter of the driven member 42 is somewhat smaller than the inner diameter of the driving member 40. The members are coaxially mounted so that they are spaced apart radially along the circumferential inner surface of the driving member and the oppositely facing circumferential outer surface of the driven member. Although FIG. 3 shows the driven member substantially completely contained within the driving member, no limitation to such an arrangement is intended. FIG. 3 also shows that the two members are spaced apart in the axial direction at the closed end of the outer or driving member. A shaft, which would be the main power shaft 18 of FIG. 1, is coupled to the closed end of the driving member 40. A notched opening, 44, at one end of the driven member 42 is for receiving a shaft, which would be shaft 24 or 24a of FIG. 1. Preferably, the driving member has a similar shaft-receiving opening at its closed end. In this manner, both the driving and driven members of the viscous coupler are detachably engaged with their respective coupling shafts to facilitate insertion and removal of the coupler. It is within contemplation of this invention to utilize other means for detachably connecting the coupler to the shafts, for example by the use of snap rings or clamps and the like, and the means described is only illustrative and not limitive. The notched opening serves, additionally, as a universal joint when used in conjunction with a shaft that has a rounded end, to permit some disalignment of shaft 24 with the main power shaft 18 such as occurs when the train is negotiating a curve.

Substantially filling the volume of space between the opposite facing circumferential surfaces of the driving and driven members is a layer of viscous fluid indicated in FIG. 3 at 46. The function of the viscous fluid can best be described in the following manner: The portion of the fluid layer which is in juxtaposition with the two facing surfaces adheres to these surfaces. When the driving member is rotated at a relatively low velocity while a load exists on the driven member, there is a shear of the fluid layer so that only a small torque is applied to the driven member, insufficient to overcome the load effect. As the angular velocity of the driving member increases the torque applied to the driven member gradually increases. This can be expressed by the equation, $L = f(w)\Delta w$, where $L$ is the torque applied to the driven member, $f(w)$ is the viscosity coefficient which is a function of the velocity, and $\Delta w$ is the difference in angular velocity of the driving and driven members. The adhesive property of the fluid also serves to prevent it from flowing out from between the surfaces. Additionally, the distance between the facing surfaces is maintained relatively small to further prevent fluid leakage because of the relatively high surface tension characteristic of the fluid. It should be understood that the foregoing is not intended as a precise theoretical analysis of the fluid's effect, but only to describe in some detail its contribution to the operation of the coupler. It should be noted, further, that the fluid also provides lubrication and acts as a coolant.

It has been found that optimum conditions of operation are met in the adaptation of a viscous coupler to a model vehicle, as taught by the instant invention, by making the distance between the facing surfaces considerably smaller than the smallest dimension of the surfaces. For an illustrative example, in a coupler built substantially similar to the described embodiment, the overall length of the members is in the order of .5 inch, the outer circumference of the driven member is in the order of 1 inch, and the radial displacement between the surfaces is .003 inch.

In the operation of the electrically powered two unit model train of FIG. 1, with no flywheel included and having only a forwardly mounted pair of propelling wheels, the electrical energy is applied to the electric motor 14 to cause main power shaft 18 to rotate. Initially the torque applied to the transmission 22 through viscous coupler 20 is insufficient to overcome the friction load of the wheels on the track and the driven member 42 does not rotate although the driving member 40 does. The driving member rotates at an increasing velocity and the torque applied to the transmission 22, and by the transmission to the wheels, gradually increases until the friction force is overcome and the train wheels begin to roll on the track. Since rolling friction is substantially less than the stopped friction, the train is able to continually pick up speed in response to increased angular velocity of the main power shaft and the driving member 40. To stop the train, the electrical energy is reduced so that the main power shaft and the driving member cease rotation. However, the train is able to come to a rolling stop since the driven member is able to continue rotation so that the transmission gearing mechanism is not locked.

With the flywheel 34 connected to the rearward extension of shaft 28 and with a rear mounted transmission 22a driving the additional pair of propelling wheels, and the motive power applied thereto from the main power shaft via viscous coupler 20a, there is further initial loading due to the inertia of the flywheel to further smoothen the acceleration. Additionally, during deceleration, the negative torque resulting from the change in angular velocity of the flywheel opposes the deceleration to further aid in bringing the train to a smooth rolling stop.

Although only one specific embodiment has been described in detail, there are a variety of species within contemplation of this invention which are readily adaptable, under the teachings of this invention, to model vehicles. For example, in the embodiment shown in FIG. 3, the inner member can be solid, as shown, or can be hollowed out. Further, the outer member need not be completely closed at one end but could have arms or ribs for attachment to its coupled shaft. Furthermore, a pair of coaxial, space-apart disc-like members with the viscous fluid therebetween could comprise the coupler. The dimensions, type of fluid, means for coupling the shafts and the like as well as the dimensions and the material for the flywheel may vary with the size and power of the particular model vehicle incorporating the invention.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

1. For a wheel-propelled miniature model vehicle having a rotating-shaft power source and a transmission for applying motive power to the wheels, in combination: means for coupling the power shaft to the transmission, comprising a cylindrical driving member axially attached to the power shaft, a cylindrical driven member axially attached to the transmission and in substantial axial alignment with said driving member, one of said members having an open end axial bore, the other of said members being disposed in spaced relationship to said one member through said open end and within said bore, with viscous fluid filling the space between said members; and inertia supplying flywheel coupled to said power shaft by identical coupling means.

2. In a model railroad train: a substantially horizontal flat main frame; a source of power attached to the upper side of the frame with a rotating power shaft extending generally in the direction of motion of the train; motion-propelling wheels connected underneath and to the sides of the frame having a coupling axle substantially transverse to the power shaft; transmission means mounted to the frame for imparting the power from the shaft to the axle; a cylindrical driving member attached substantially coaxially to the power shaft; a cylindrical driven member; one of said members having an axial cavity extending from an open end thereof; the other of said members disposed coaxially in spaced relationship with said one member within said cavity through said open end; viscous fluid substantially filling the space between said members within the cavity; means detachably connected between said driven member and said transmission for transmitting the axial rotation of said driven member to said transmission; and a flywheel for supplying added inertia during starting and stopping of the model train said flywheel being coupled to said power source in the same manner as said transmission is coupled.

3. The apparatus as in claim 2 characterized by the spaced relationship of said driving and driven members being such that surface tension prevents any substantial loss of fluid from the cavity through said open end.

4. In a model vehicle: a rotating main power member; motion-impelling wheels; a transmission for imparting motive power to said wheels; a first coupling comprising, a rotatable driving member connected to the rotating main power member, a rotatable driven member coupled to the transmission, said driving and driven members having spaced-apart facing surfaces defining an open-end fluid-confining area and having their axes of rotation in substantial alignment, a viscous fluid having a viscosity coefficient, $f(w)$, which is a function the velocity, substantially filling the space between said facing surfaces; and retained therebetween by the viscosity; said coupling being the sole means for imparting torque, L, to the transmission from the main power member, said torque thereby being equal to $f(w)\Delta w$, where $\Delta w$ is the difference in angular velocity of the driven and driving members; a flywheel for providing counteracting inertia forces during acceleration and deceleration; and a second coupling identical to said first coupling for connecting said flywheel to said main power member.

5. For a model train, apparatus for applying motive power to the train wheels comprising the combination of: a rotatable main power shaft extending generally along the line of travel of the train; transmission means including means for receiving rotational torque about an axis substantially parallel to said main power shaft and means for applying said received torque to the wheels about an axis substantially transverse to said former axis; a viscous coupler comprising coaxial driving and driven member having spaced-apart facing surfaces with viscous fluid substantially filling the space therebetween for transferring torque which varies in accordance with the angular velocity of the respective members; means coupling said driving member to said main power shaft; a rotatable shaft connected at one end to said driven member and extending into coupling engagement with the power receiving means of the transmission means; and a further rotatable member connected to the other end of said latter shaft for developing negative torque in response to any change in angular velocity of said shaft.

References Cited by the Examiner

UNITED STATES PATENTS

| | | | |
|---|---|---|---|
| 1,238,098 | 8/17 | Brinton. | |
| 1,984,831 | 12/34 | Higley | 74—664 |
| 2,253,001 | 8/41 | Webb et al. | |
| 2,629,472 | 2/53 | Sterner. | |
| 2,708,018 | 5/55 | Dudley | 192—58 |
| 2,758,484 | 8/56 | Keltner | 74—664 X |
| 2,768,536 | 10/56 | Wolfram | 74—664 |
| 2,903,974 | 9/59 | Smith | 46—217 X |

FOREIGN PATENTS 1,208,025 9/59 France.

DON A. WAITE, *Primary Examiner.*